(12) United States Patent
Fan

(10) Patent No.: US 11,655,925 B1
(45) Date of Patent: May 23, 2023

(54) CONNECTOR SYSTEM AND METHOD OF USE

(71) Applicant: Tiejun Fan, Brookshire, TX (US)

(72) Inventor: Tiejun Fan, Brookshire, TX (US)

(73) Assignee: Texas First Industrial Corp, Brookshire, TX (US)

(*) Notice: Subject to any disclaimer, the term of this patent is extended or adjusted under 35 U.S.C. 154(b) by 669 days.

(21) Appl. No.: 15/829,707

(22) Filed: Dec. 1, 2017

Related U.S. Application Data

(60) Provisional application No. 62/428,940, filed on Dec. 1, 2016.

(51) Int. Cl.
| | |
|---|---|
| *F16L 37/12* | (2006.01) |
| *F16L 37/62* | (2006.01) |
| *E21B 33/06* | (2006.01) |
| *E21B 33/064* | (2006.01) |

(52) U.S. Cl.
CPC .............. *F16L 37/62* (2013.01); *E21B 33/06* (2013.01); *E21B 33/064* (2013.01); *F16L 37/12* (2013.01)

(58) Field of Classification Search
CPC .................................. F16L 37/62; F16L 37/12
USPC ............................................................ 92/172
See application file for complete search history.

(56) References Cited

U.S. PATENT DOCUMENTS

| | | | | |
|---|---|---|---|---|
| 3,667,721 A | * | 6/1972 | Vujasinovic | F02F 1/22 251/1.1 |
| 4,283,039 A | * | 8/1981 | Schaeper | E21B 33/06 251/1.2 |
| 4,349,041 A | * | 9/1982 | Bates | E21B 33/06 137/1 |
| 4,614,148 A | * | 9/1986 | Bates | E21B 33/06 251/1.1 |
| 4,858,882 A | * | 8/1989 | Beard | E21B 33/06 251/1.2 |
| 10,316,607 B2 | * | 6/2019 | Leuchtenberg | E21B 33/06 |
| 2015/0034384 A1 | * | 2/2015 | Leuchtenberg | E21B 33/064 175/5 |
| 2015/0275609 A1 | * | 10/2015 | Liotta | E21B 33/06 166/379 |
| 2018/0030803 A1 | * | 2/2018 | Jones | E21B 33/06 |

* cited by examiner

*Primary Examiner* — Matthew Troutman
*Assistant Examiner* — James A Linford
(74) *Attorney, Agent, or Firm* — Richard Eldredge; Leavitt Eldredge Law Firm

(57) ABSTRACT

A pipe connector system includes an upper housing forming an upper inner cavity; a lower housing forming a lower inner cavity, the upper inner cavity is coaxially aligned with the lower inner cavity; a piston cavity formed between the upper housing and lower housing; a piston disposed within the piston cavity, the piston is configured to slidingly engage within the piston cavity; a locking device configured to traverse within the upper housing, the locking device having a plurality of locking jaws surrounding a periphery of the inner cavity, the locking device, having a base integral with the plurality of locking jaws, the base is configured to rest on the piston; a first port in fluid communication with an upper chamber positioned at a first end of the piston within the piston chamber; and a second port in fluid communication with a lower chamber positioned at a second end of the piston within the piston chamber.

1 Claim, 7 Drawing Sheets

CONNECTOR SYSTEM AND METHOD OF USE

BACKGROUND

1. Field of the Invention

The present invention relates generally to connectors.

2. Description of Related Art

Pipe connectors are well known in the art and are effective means to interlock two joining pipes. For example, FIG. 1 depicts a conventional pipe connector 101 having a housing 103 with a plurality of threaded connector rods extending from an outer surface of the housing 103 and configured to engage with a mandrel and/or other means secured to an adjoining pipe (not shown).

Although effective in most applications of use, it should be understood that connector 101 has significant disadvantages. For example, the adjoining pipe may not have a mandrel with the number of holes associated with the connector rods 105. Further, the process of connecting each rod is tedious and time consuming.

According, great strides have been made in the area of connectors, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
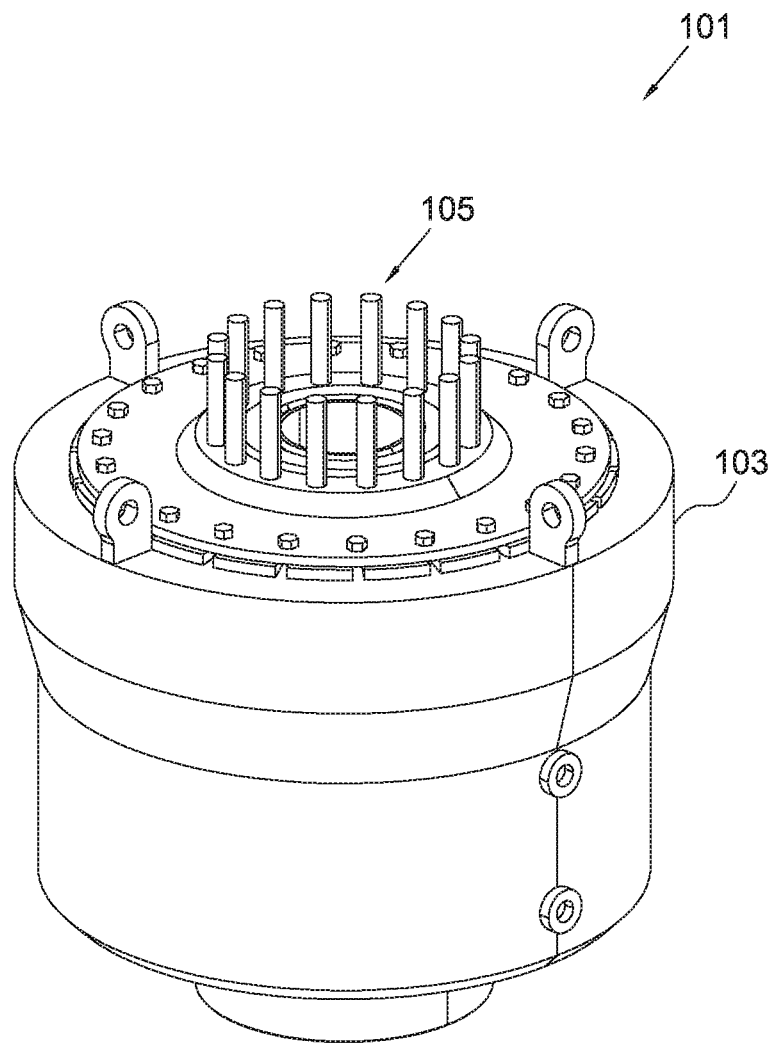
FIG. 1 is a front oblique view of a conventional connector.
Figure 2:
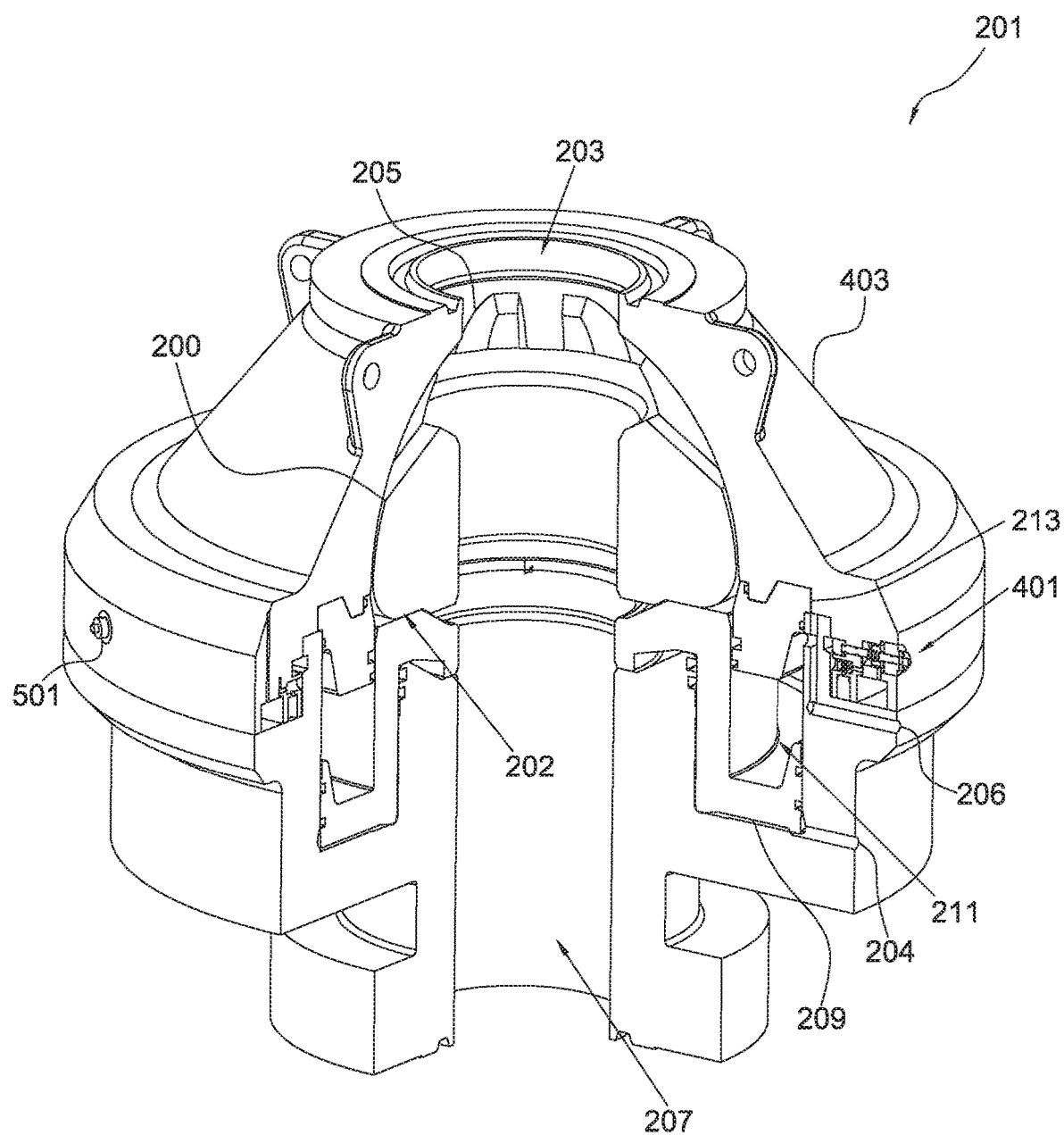
FIG. 2 is an oblique partial cross-sectional view of the preferred embodiment of the present application.
Figure 3:
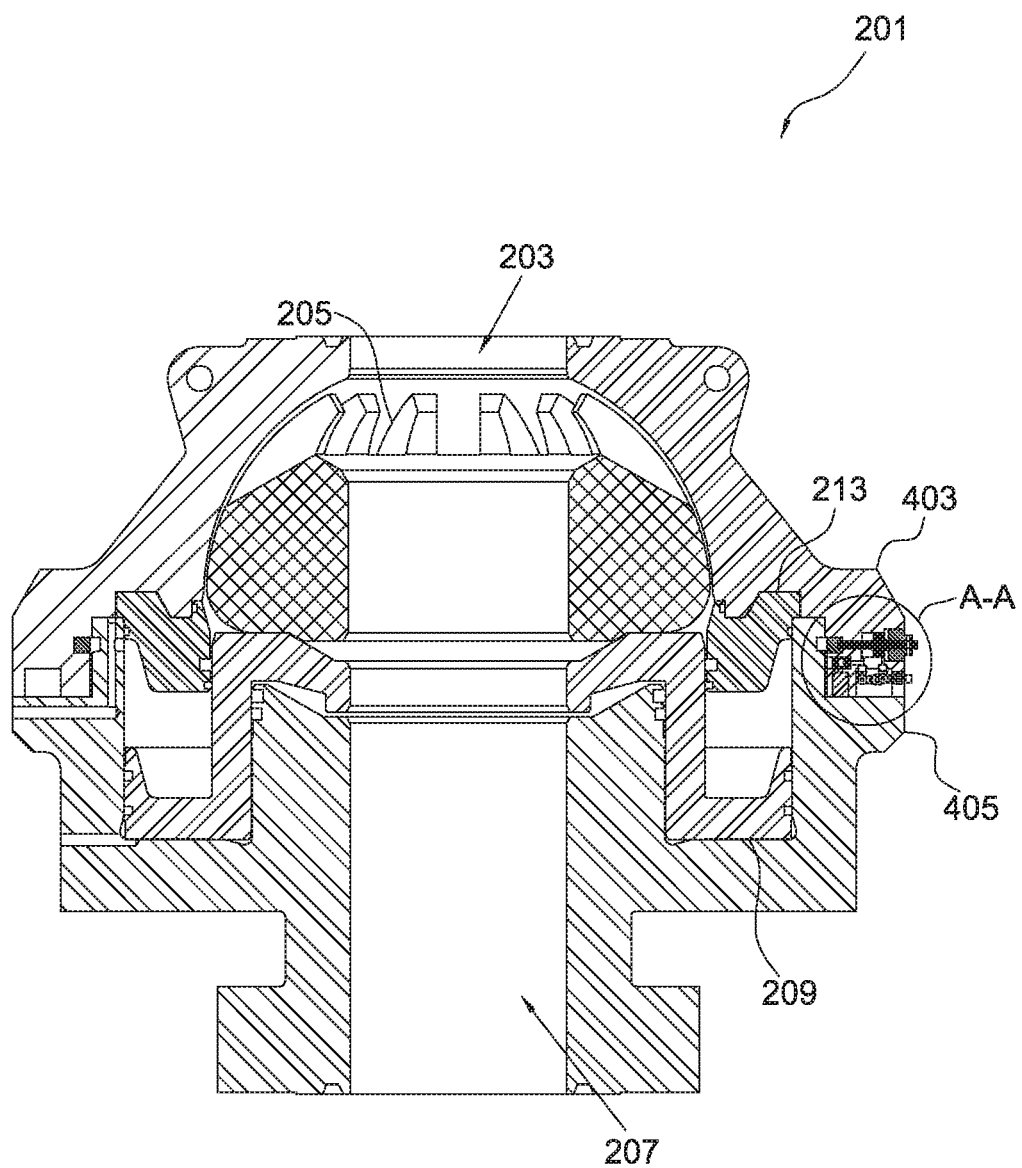
FIG. 3 is a front cross-sectional view of the system of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with pipe connectors. The system and method of use will be understood, both as to its structure and operation, from the accompanying drawings, taken in conjunction with the accompanying description. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIGS. 2-5 depict various embodiments of a connector system 201 in accordance with the preferred embodiment of the present application. It will be appreciated that system 201 overcomes at least one of the above-listed problems commonly associated with the conventional pipe connectors.

In the contemplated embodiment, system 201 preferably includes one or more of body having an upper housing 403 that forms an inner cavity 203 and a lower housing that forms an inner cavity 207.

A locking device 205 sits within the inner cavity 203 and is configured to slidingly engage with an inner surface of the upper housing 403. The locking device 205 includes a plurality of locking jaws configured to engage with a mandrel and/or other device associated with a pipe (not shown). The locking device 205 is further provided with a base 200 having a hollow center and a lower surface 202 that engages with a piston 209. During use, the piston 209 traverses within a piston cavity 211 positioned between upper housing 403 and lower housing 405, which in turn moves locking device 205 within the cavity 203.

In the contemplated embodiment, two ports 204, 206 are in fluid communication with the piston cavity 211 on opposing ends of the piston 209. During use, hydraulic fluid passes through the ports 204, 206 to push against the piston, which in turn moves the piston within the cavity 211 until the piston reaches an adapter ring 213.

Figure 4A:
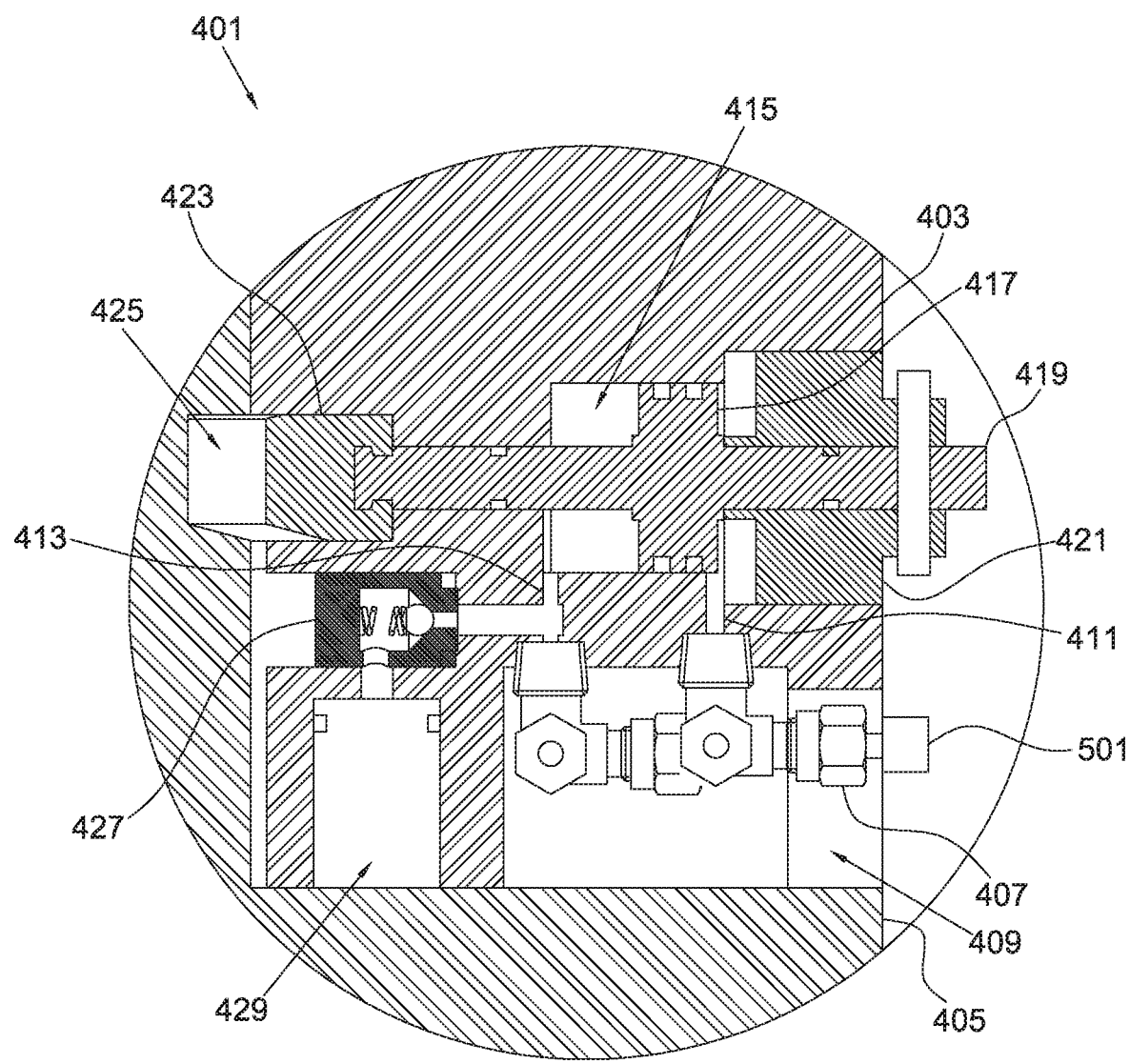
FIGS. 4A, 4B, and 4C are partial views of the locking mechanism of the system of FIG. 2 taken at A-A.
Figure 4B:
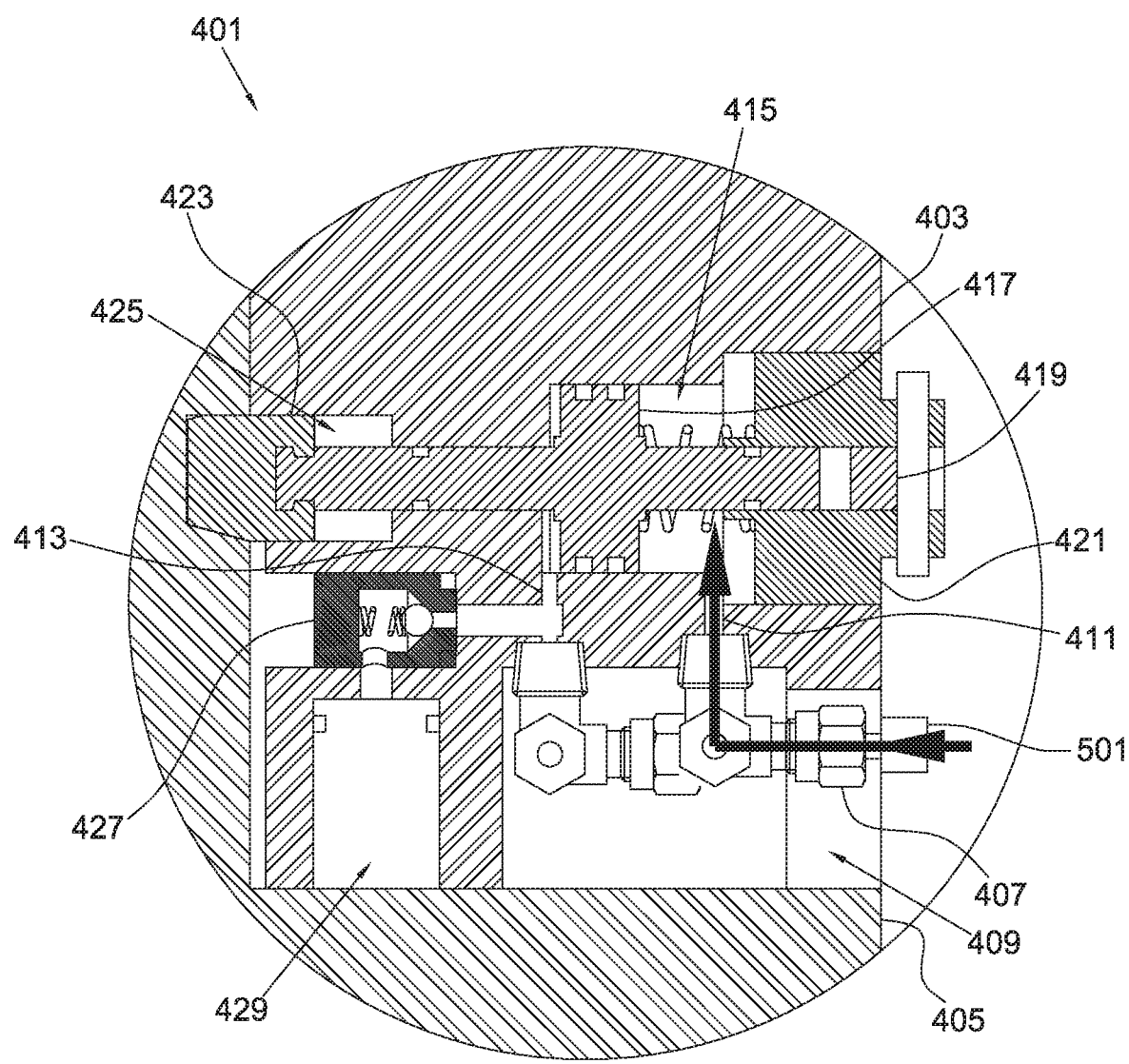
Figure 4C:
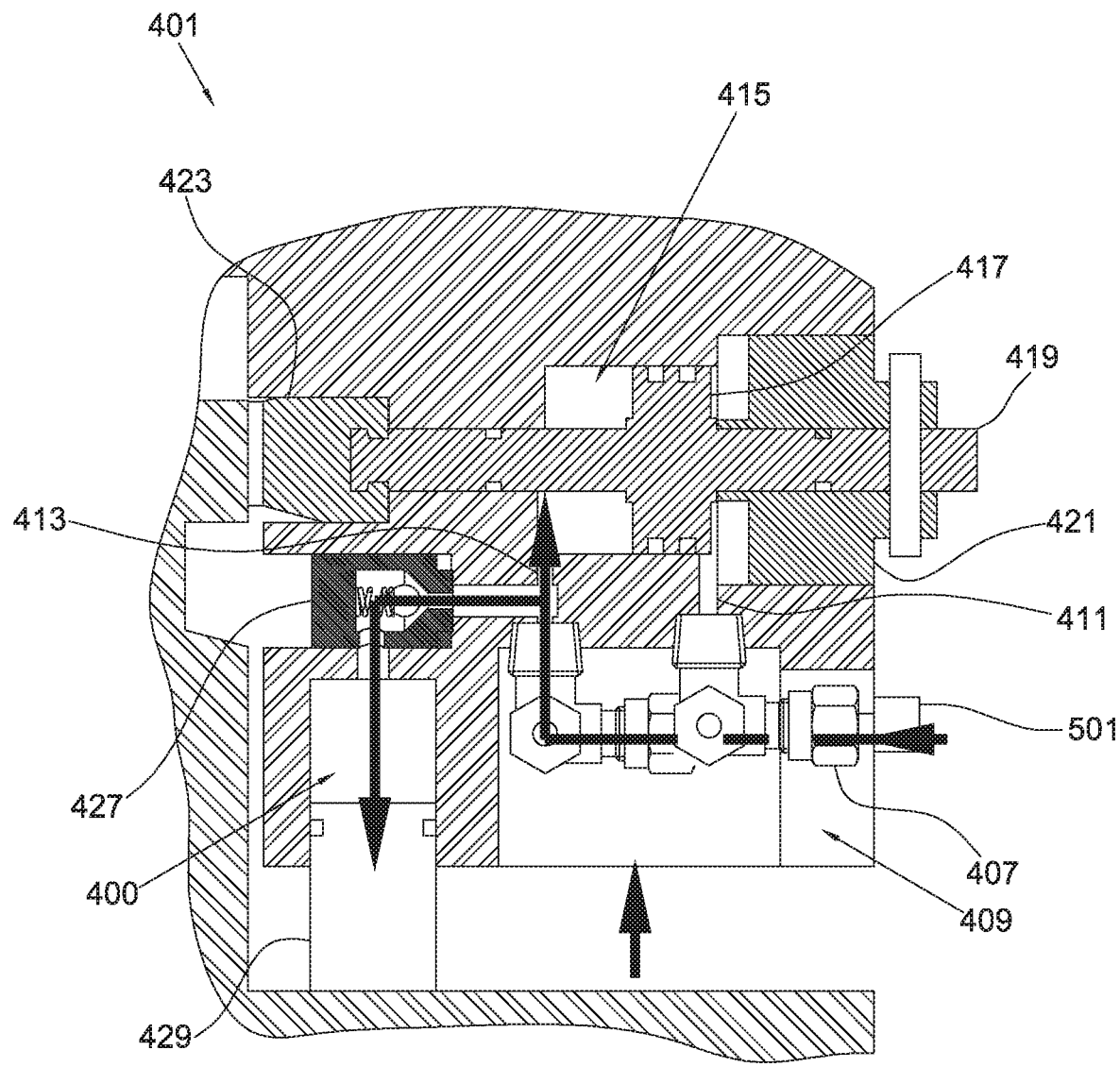

A piston locking mechanism 401 is utilized to secure the piston 209 in a stationary position. As depicted in FIGS. 4A, 4B, and 4C, the piston locking mechanism 401 includes one or more of a valve assembly 407 in fluid communication with a piston chamber 415 and in fluid communication with a hydraulic pump (not shown) via a port connector 501. The valve assembly extends within an opening 409 of lower housing 405 and provides fluid transfer to opposing ends of a piston head 417 disposed within a fluid chamber 415 via ports 411, 413. The piston head 417 is secured to a rod 419 that slidingly engages within the fluid chamber 415 and a housing 421.

Figure 5:
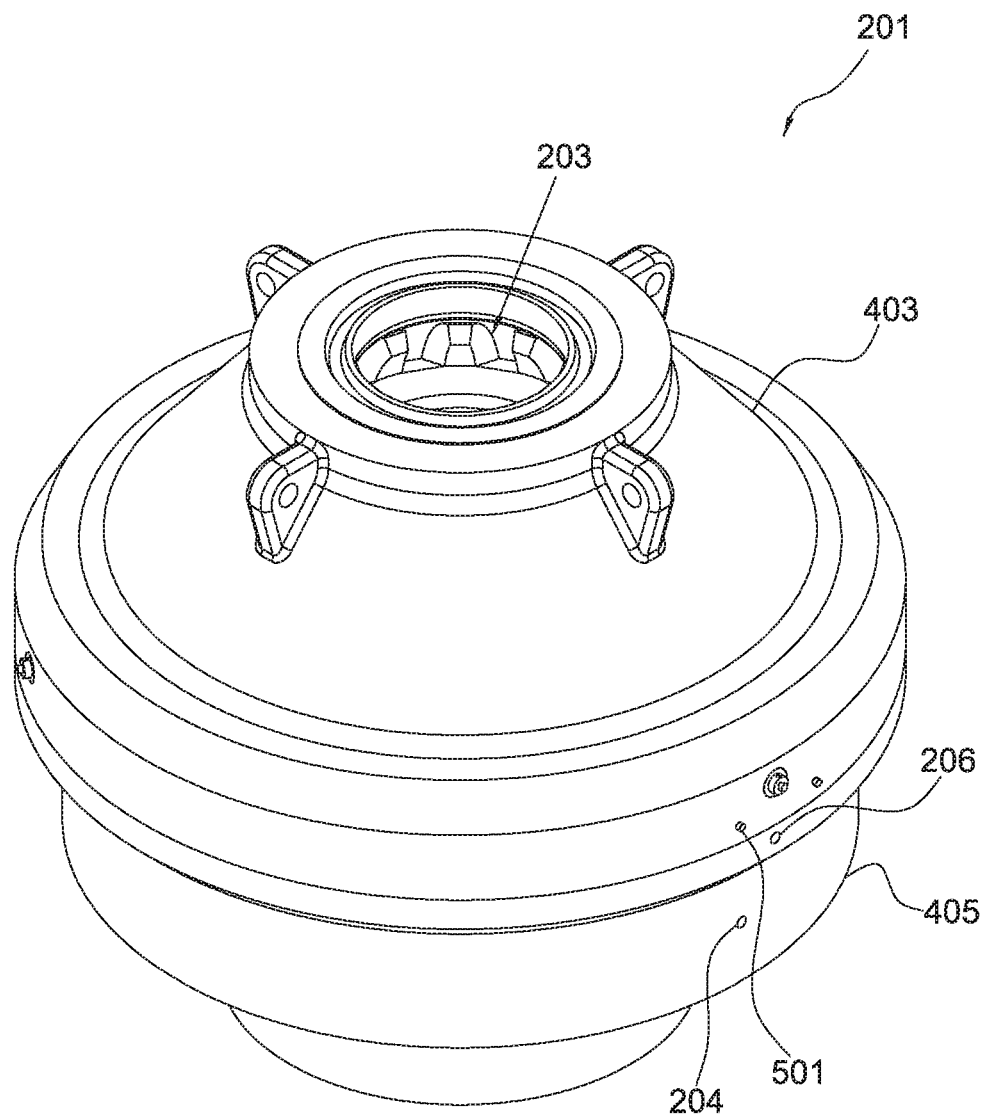
FIG. 5 is an oblique view of the system of FIG. 2.

A locking device 423 is secured to one end of the rod 419 and is configured to slidingly engage within a notch 425 of lower housing 405, which in turn secures the piston 209 in a fixed position and the locking device 205 in a fixed position. As shown in FIG. 4B, the fluid travels through the valve assembly, pushes against the piston head, which in turn locks the lower housing in a fixed position. As depicted in FIG. 4C, the hydraulic fluid passes through the valve assembly through port 413 to unlock the locking device, passes through a housing 427 before entering a fluid chamber 400. The fluid entering chamber 400 pushes against a block 429, which in turn moves the upper housing away from the lower housing, as depicted with a plurality of arrows. FIG. 5 depicts an assembled view of the system 201.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A pipe connector system, comprising:
   an upper housing forming an upper inner cavity;
   a lower housing forming a lower inner cavity, the upper inner cavity is coaxially aligned with the lower inner cavity, the lower housing having an elongated block;
   a piston cavity formed between the upper housing and lower housing;
   a piston disposed within the piston cavity, the piston is configured to slidingly engage within the piston cavity in a horizontal direction relative to an elongated length of the lower inner cavity;
   a locking device configured to traverse within the upper housing, the locking device having a plurality of locking jaws surrounding a periphery of the inner cavity, the locking device, having:
     a base integral with the plurality of locking jaws, the base is configured to rest on the piston;
     a first port in fluid communication with an upper chamber positioned at a first end of the piston within the piston chamber; and
     a second port in fluid communication with a lower chamber positioned at a second end of the piston within the piston chamber; and
   a locking housing configured to slidingly engage with the elongated block in a vertical direction relative to the horizontal direction;
   wherein the locking housing moves in the horizontal direction as locking device is in an unlocked position;
   wherein fluid entering through the first port causes the piston to move in a first direction; and
   wherein fluid entering through the second port causes the piston to move in a second direction.

* * * * *